Nov. 26, 1940.   W. F. HALL ET AL   2,222,839
APPARATUS FOR ELECTROPROCESSING
Filed Sept. 22, 1937   13 Sheets—Sheet 1

Inventors
WESLEY F. HALL
GEORGE B. HOGABOOM
By Toulmin & Toulmin
Attorneys

Nov. 26, 1940.  W. F. HALL ET AL  2,222,839
APPARATUS FOR ELECTROPROCESSING
Filed Sept. 22, 1937  13 Sheets-Sheet 5

Inventors
WESLEY F. HALL
GEORGE B. HOGABOOM
By Toulmin & Toulmin
Attorneys

Nov. 26, 1940.  W. F. HALL ET AL  2,222,839
APPARATUS FOR ELECTROPROCESSING
Filed Sept. 22, 1937   13 Sheets-Sheet 6

Inventors
WESLEY F. HALL
GEORGE B. HOGABOOM
By Toulmin & Toulmin
Attorneys Nov. 26, 1940.  W. F. HALL ET AL  2,222,839
APPARATUS FOR ELECTROPROCESSING
Filed Sept. 22, 1937  13 Sheets-Sheet 12

Inventors
WESLEY F. HALL
By GEORGE B. HOGABOOM
Toulmin & Toulmin
Attorneys

Patented Nov. 26, 1940

2,222,839

UNITED STATES PATENT OFFICE 2,222,839

APPARATUS FOR ELECTROPROCESSING

Wesley F. Hall, Matawan, N. J., and George B. Hogaboom, New Britain, Conn., assignors to Hanson-Van Winkle-Munning Co., Matawan, N. J., a corporation of New Jersey Application September 22, 1937, Serial No. 165,158

8 Claims. (Cl. 204—202)

This invention relates to electroprocessing machines and methods, and in particular, to such machines and methods wherein the workpiece is caused to travel while being subjected to the electroprocessing action.

One object of this invention is to provide a method of electroprocessing articles or workpieces, wherein the article or workpiece is caused to travel through an electroprocessing solution, and likewise caused to move transversely during such travel.

Another object is to provide a method of electroprocessing articles or workpieces, wherein the article or workpiece is caused to travel through the electroprocessing solution and simultaneously caused to oscillate to and fro transversely to the direction of travel.

Another object is to provide a method of electroprocessing articles or workpieces, wherein the workpiece is caused to pursue a path through the solution consisting of a general direction or forward travel combined with sidewise oscillation.

Another object is to provide a method of electroprocessing workpieces, wherein the workpiece is caused to pursue an undulating path through the electroprocessing solution.

Another object is to provide an electroprocessing apparatus having means for moving a workpiece longitudinally through a tank, and having means for moving the workpiece transversely to the direction of longitudinal motion.

Another object is to provide an electroprocessing apparatus having means for moving a workpiece in an orbital path, and subjecting the workpiece to motion transverse to this orbital path.

Another object is to provide an electroprocessing apparatus having means for moving a workpiece in a longitudinal path while causing it to execute transverse oscillations.

Another object is to provide an electroprocessing apparatus having means for moving a workpiece in an orbital or longitudinal path, together with means for moving the workpiece transversely so as to cause the workpiece to pursue an undulating path through the solution.

Another object is to provide an electroprocessing apparatus, wherein power-driven means is provided to cause the workpiece to pursue an orbital or longitudinal path through the electroprocessing solution, and independent power-driven means for causing the workpiece to execute transverse oscillations while pursuing this orbital path.

Another object is to provide an electroprocessing apparatus, wherein power-driven means is provided for causing the workpiece to execute transverse movements or oscillations, other mechanism being provided and responsive to this sidewise motion to cause the workpiece to move in a longitudinal path or an orbital path.

*General construction*

In general, the electroprocessing method of this invention consists in moving the workpiece or article in one general direction while subjecting the workpiece to motions transverse to that general direction. Optionally, the workpiece may be moved in an undulating path (Figure 10) or in a looped path. The apparatus of the invention generally consists of an elongated tank through which the workpiece is caused to move, as by an endless conveyor chain. At the same time the conveyor chain and work carriers are caused to move bodily in a transverse direction while the work carriers are moving in a longitudinal direction along the tank. The conveyor chain is moved either by a separate motor from the motor employed to oscillate the mechanism, or else a ratchet mechanism is optionally employed for moving the chain in response to the transverse oscillations.

The mechanism of this invention is particularly applicable to the so-called semi-automatic electroprocessing machine. Such machines ordinarily have a single electroprocessing tank and conveyor mechanism to carry the workpieces through the solution in the tank and back to a starting point. The tank may be arranged in an orbital path and an endless chain used to convey the workpieces through the orbitally arranged tank.

Hitherto, semi-automatic machines have been used to provide a continuously moving cycle of workpiece treatment, thereby saving the operator from the necessity of walking around the apparatus to remove the workpiece. The semi-automatic apparatus also tends to give the workpieces a more uniform treatment as to current density, temperature and time, and tends to bring fresh solution into contact with the workpieces. In such machines as now known, however, the maximum rate of movement possible through the tank is not sufficiently rapid to increase the permissible rate of metal deposit much beyond that for a still tank. The reason for this lies in the fact that the plating process requires at least ten to thirty minutes so that even in a long conveyor the workpieces move but a few feet per minute, each workpiece moving into a position vacated by the preceding piece, and hence, into a portion of the solution which has already been used.

Furthermore, in the normal arrangement of a workpiece in an electroplating solution, the cyanide or acid dissolves the anode and releases metal ions to the cathode, thereby making the solution adjacent the anode high in metal content and low in cyanide or acid. Adjacent the cathode, however, the solution is high in cyanide or acid content and low in metal ion concentration. The difference in density thus set up causes a circulation of solution resembling convection currents. The result is that the cathode or workpiece is caused to receive metal more heavily at the bottom than at the top.

If the cathode consists of a number of workpieces one above the other, the lower pieces will receive a much heavier deposit than the upper pieces. Workpieces which project toward the anode will receive heavier deposits on the projecting portions than on more centrally located portions because more current flows to the outer edges of the workpiece than to the center. One purpose of the present invention is to break up this unequal concentration of the solution by causing the solution to flow at a fairly rapid rate from the anode to the cathode, and thereby eliminate the natural convection. By moving the workpieces transversely this mass flow of solution across the tank is caused to take place in such a manner that the portion of the solution surrounding the anodes is mixed with that surrounding the cathodes, and a uniform solution concentration of composition tends to exist at all points. Preferably the amount of movement of the cathodes or workpieces across the tank is limited so as not to cause an excessive current density by a close approach of the cathode to the anode. The rate of oscillation is also made slow enough to actually move the solution rather than merely to churn it at the cathode surface.

In the present invention several workpieces are preferably moved in a body so that the adjacent or outside edges of the workpieces are partially shielded by the adjacent workpieces. When workpieces are moved individually this shielding action is absent, and the workpieces tend to plate more heavily upon their outside edges because they are not shielded by the adjacent workpieces or racks. If revolving racks are used only a portion of the workpieces on the racks are spaced properly with regard to the anodes, which necessarily are arranged in straight lines in a conveyor type machine. The remainder of the workpieces on a revolving rack are too far from the anodes to receive a rapid deposit, and the average rate of deposit is accordingly low.

*Machine with crank-oscillated conveying mechanism*

Referring to the drawings in detail, Figures 1 to 10, inclusive show one embodiment of the electroprocessing machine of this invention, as well as one apparatus by which the method of this invention can be carried out. This machine (Figures 1 and 4) consists of a tank 10, preferably arranged in an orbital path (Figure 10), having outer walls 11 and inner walls 12, together with a bottom 13 joining these two walls. Adjacent the outer and inner walls are enclosures 14 and 15, respectively containing steam heating coils 16 and 17 supplied with steam from pipes 18, 19 and 20, and controlled by the steam valve 21. These heating pipes are not necessary in all processes and may be arranged at the bottom of the tank as well as at the sides. The bottoms 13 of the tanks 10 are supported upon cross members 22, preferably of channel or I-beam construction.

The top, outer and inner edges of the tank 10 are provided with overhanging portions 23 and 24, respectively, these serving to provide support for the rods 25 and 26, from which the anode racks 27 are suspended. The anode racks 27 in the present embodiment are shown as constructed for silver plating, particularly with reference to the plating of silver spoons, and the like. In silver plating the anode racks 27 are loaded with silver rods placed on the inclined pegs 28. In plating workpieces with other metals, however, it is frequently sufficient merely to suspend anodes in the form of rods from the horizontal rods 25 and 26.

In the present machine two rows of workpieces are shown as being plated on a single machine, and suspended from a single work-holding arm. In this instance additional anode racks 27 are suspended from rods 29 mounted on the anode supports 30, which rise from the bottom 13 of the tank. Where a single row of workpieces is to be plated, the additional anode supports 30 and additional or middle rods 29 are omitted, together with their anode racks 27.

Figure 5:
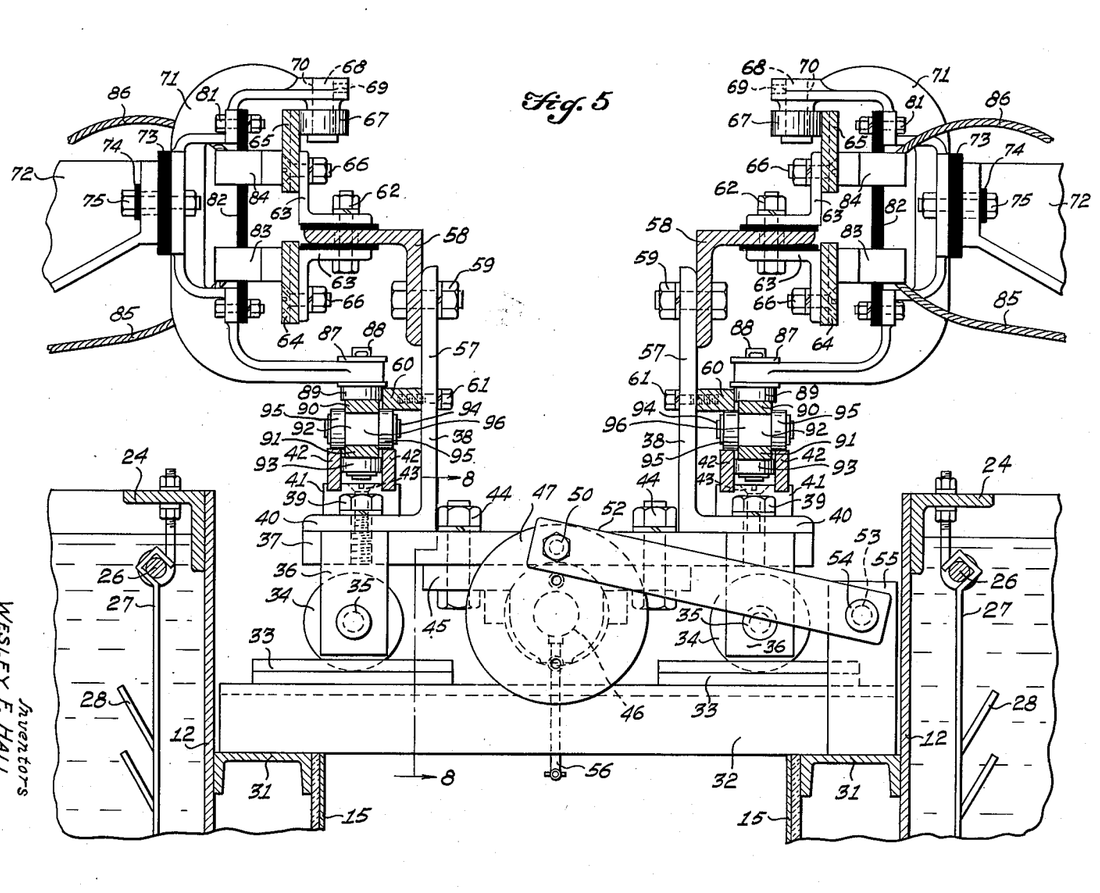
Figure 5 is an enlarged cross section of the oscillating mechanism of the machine, taken along the line 5—5 in Figure 3.

Mounted on and extending between the tops 31 of the inner enclosures 15 are cross members 32 (Figures 4 and 5) which serve to support grooved guide rails 33. Arranged to reciprocate in these guide rails are rollers 34 mounted upon axles 35, supported in brackets 36 secured to the bed plates 37. Mounted on the bed plates 37 are upwardly extending angle members 38 and secured thereto by the bolts 39. Supported upon the horizontal portions 40 of the angle members 38 are supporting blocks 41 for supporting the chain rails 42. The supporting blocks 41 are secured to the angle members 38 by means of the screws 43. Also secured to the bed plates 37, as by the bolts 44, is a bearing block 45 (Figures 5 and 8) adapted to rotationally support a shaft 46 having on each end thereof a head 47 secured thereto by the screws 48. Each head 47 is provided with a threaded socket 49 for receiving the threaded end of a pivot stud 50 passing through a bore 51 in one end of a pitman 52. The pitman 52 at its other end is provided with a similar bore 53, through which passes the pivot pin 54 similarly secured in the frame member 55 attached to the cross member 32 (Figure 5). Lubrication of the shaft 46 in its bearing block 45 is facilitated by the provision of the right-angled lubricant conduit 56 for use with known grease or other lubricant pressure distributing systems.

Figure 1:
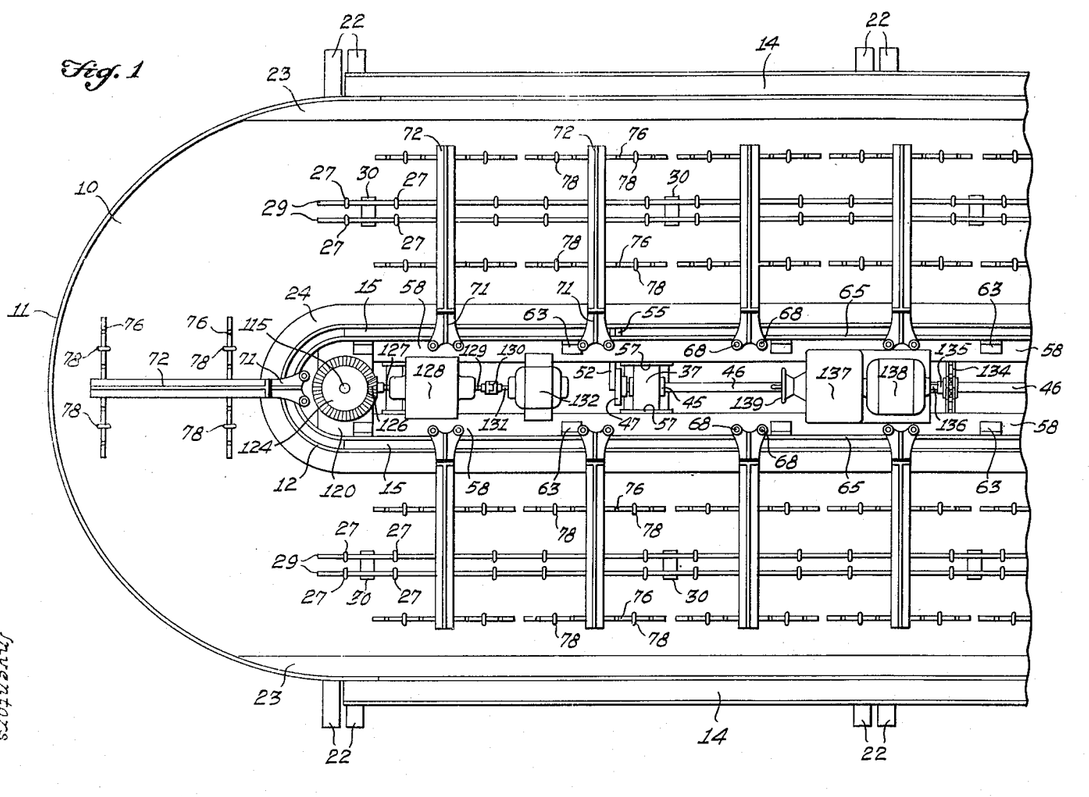
Figure 1 is a top plan view of an end portion of an electroprocessing machine according to the present invention.
Figure 2:
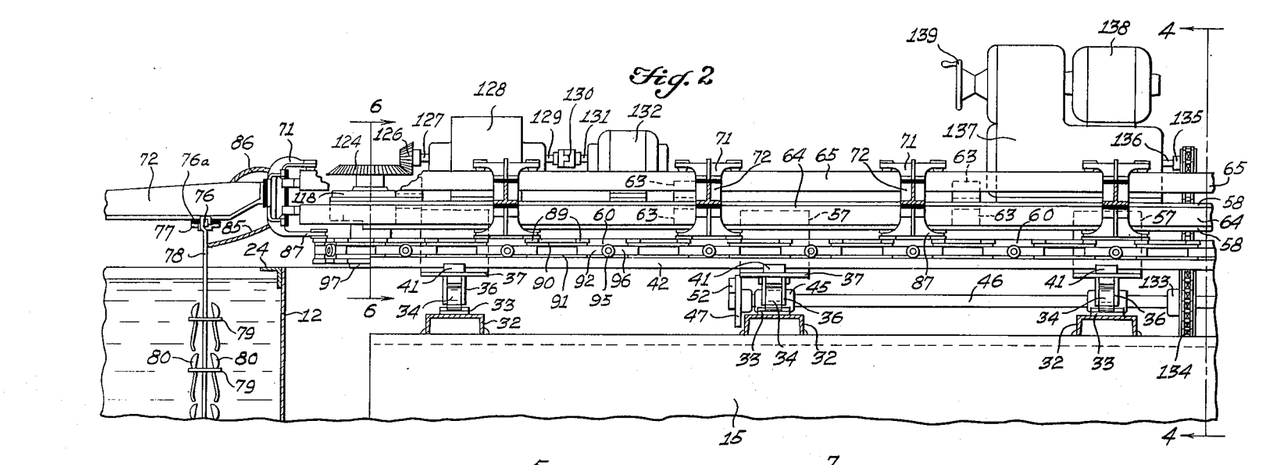
Figure 2 is a side elevation of a portion of the electroprocessing machine shown in Figure 1, with parts of the tanks and conveying mechanism broken away to disclose the construction more clearly.
Figure 3:
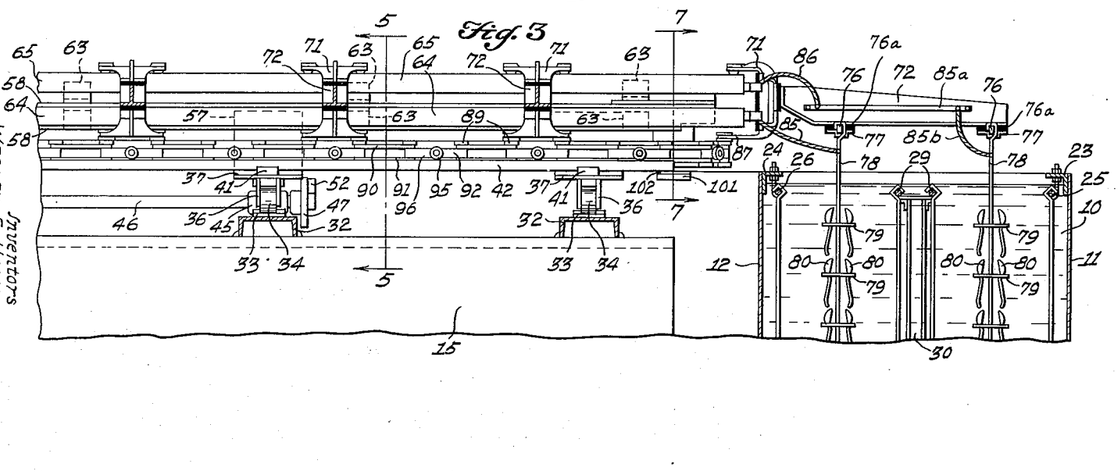
Figure 3 is a side elevation, partly in section, of the opposite end of the machine shown in Figures 1 and 2.
Figure 4:
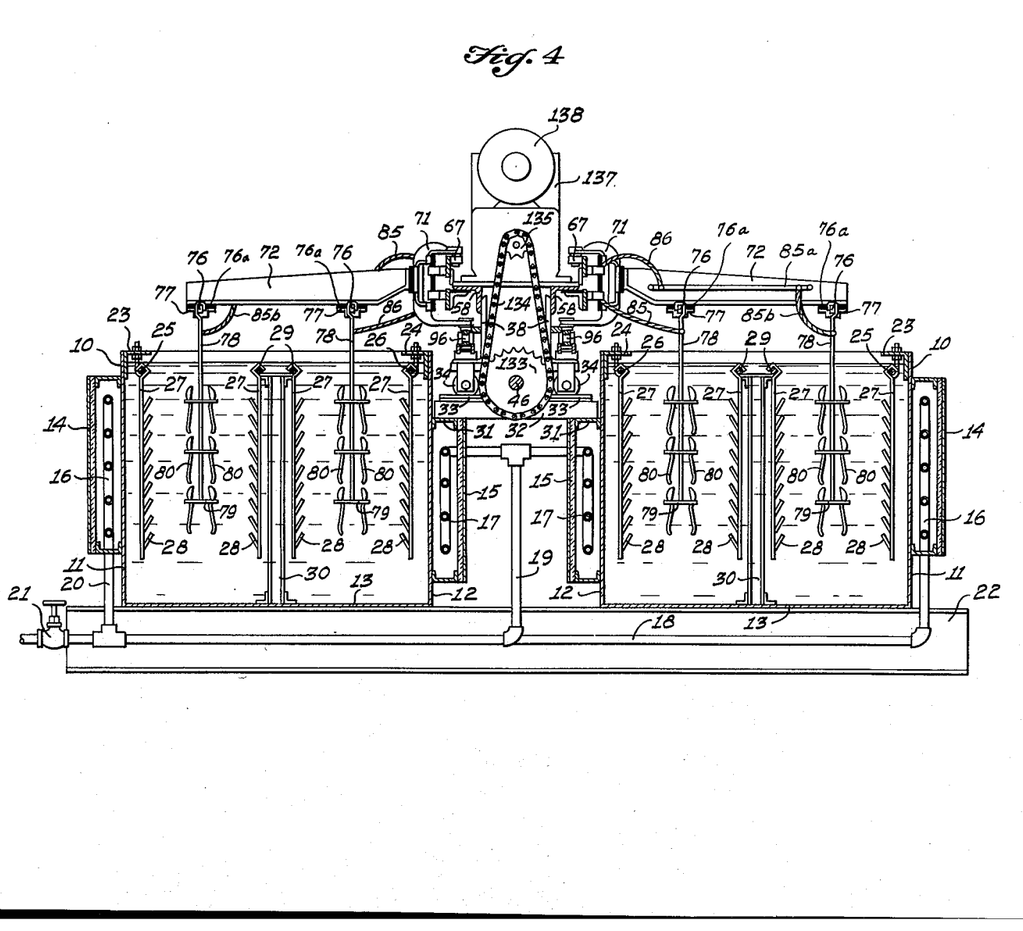
Figure 4 is a cross section through the machine shown in Figures 1 to 3, taken along the line 4—4 in Figure 2.

The upright portions 57 of the angle members 38 carry horizontally extending angle beams 58, attached thereto by means of the bolts 59, and at an intermediate point are attached the roller rails 60, as by the cap screws 61 (Figure 5). Secured to the angle beams 58, as by the bolts 62, are the oppositely extending angle brackets 63, to which are attached the cathode rails 64 and 65, as by the bolts 66. The upper cathode rail 65 is engaged by rollers 67, insulatedly mounted upon the pivot pins 68, secured by the set screws 69 in the bores 70 in the upper end of a roughly C-shaped hanger 71. The rollers 67 are mounted in pairs upon the upper hangers 71 (Figures 1 and 2).

Secured to each hanger 71 is a work carrier arm 72, insulated therefrom by the insulating layers 73 and 74 (Figure 5). The carrier arms 72 (Figure 4) are provided with cross members 76 insulated therefrom, as at 76a, and secured to their lower edges by the members 77. From the cross members 76 are suspended the work-holding racks 78, which have carrier members 79, upon which are placed the workpieces 80. Bolted as at 81 to the inner side of the hanger 71 is an insulating member 82 upon which are mounted the contact brushes 83 and 84. The brush 83 is connected by the conductor cable 86 to the inner work-holding rack 78, whereas the brush 84 is connected by the conductor cable 85 to the conductor bar 85a mounted upon but insulated from the workcarrier arm 72 and, in turn, connected by the cable 85b to the outer work-holding rack 78. The brushes 83 and 84 engage the cathode rails 64 and 65, respectively, these being connected to the negative terminals of the electroplating current generator by bus bars (not shown).

The C-shaped hangers 71 continue downwardly and inwardly, and at their lower ends 87 are connected to downwardly extending pins 88 forming portions of an endless conveyor chain 96. The latter on its pins 88 carries rollers 89 engaging the roller rails 60, and also upper and lower chain links 90 and 91, the chain blocks 92 and rollers 93 running between the parallel rails 42. The chain blocks 92 are provided with horizontal axles 94 carrying rollers 95 adapted to rest and run upon the top edges of the rails 42 (Figure 5).

Figure 6:
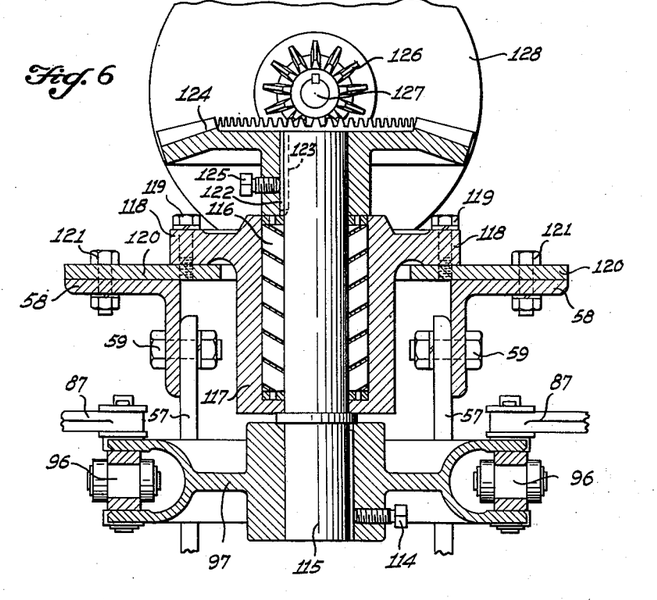
Figure 6 is a vertical section through the axis of the conveyor chain driving shaft, taken along the line 6—6 in Figure 2.
Figure 7:
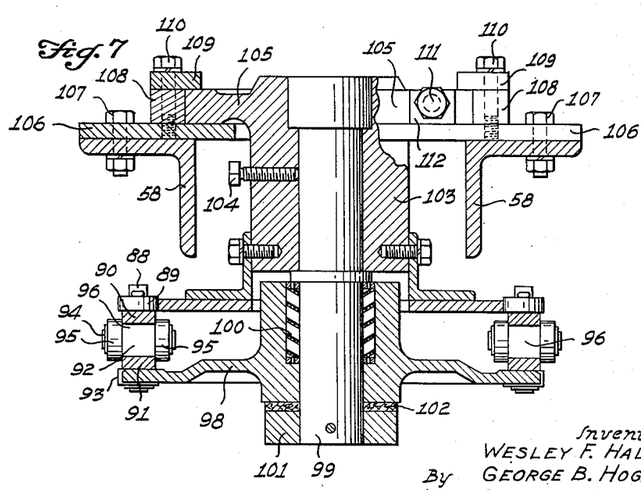
Figure 7 is a vertical section through the shaft of the conveyor chain idler sprocket, taken along the line 7—7 in Figure 3.
Figure 8:
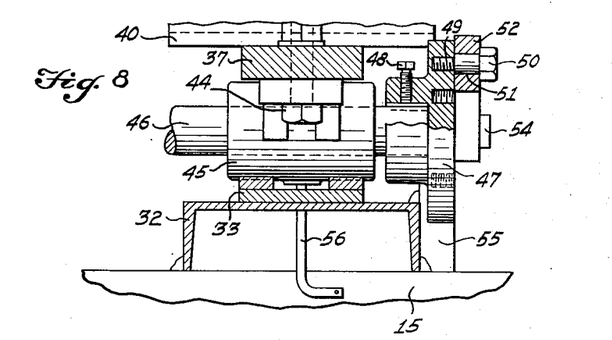
Figure 8 is an enlarged vertical section along the line 8—8 in Figure 5, showing a portion of the oscillating mechanism.
Figure 9:
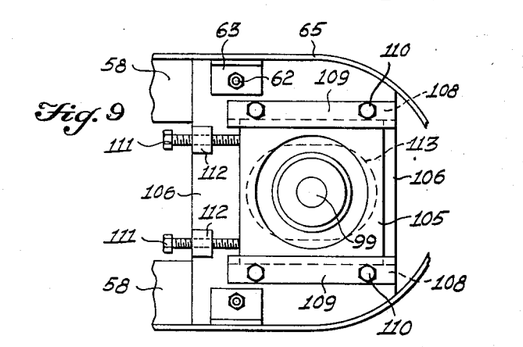
Figure 9 is an enlarged top plan view of the conveyor chain idler sprocket adjustment shown in Figure 7.

The endless conveyor chain 96 pursues an orbital path and at its opposite ends passes around sprockets 97 and 98, respectively (Figures 6 and 7). The sprocket 98 is an idler sprocket, mounted loosely upon the vertical shaft 99 with anti-friction bearings 100. The shaft 99 is provided with a retaining collar 101 and thrust bearing 102, and is secured within the sprocket mounting 103 by means of the set screw 104. The sprocket mounting 103 at its upper end terminates in a squared head 105 (Figure 9), resting upon the members 106, which in turn, rest upon and are secured to the angle beams 58 by the bolts 107. The blocks 108 and retaining bars 109 are bolted by the cap screws 110 to the member 106 to provide proper retaining of the head 105 and permit reciprocation thereof. In order to take up slack in the conveyor chain 96, cap screws 111 are arranged to pass through supporting ears 112, projecting upwardly from the member 106 and engage one edge of the squared head 105. The member 106 is provided with an elongated aperture 113 to permit motion of the sprocket mounting 103 to and fro under the influence of the cap screws 111.

The driving sprocket 97 is secured by the set screw 114 to the sprocket shaft 115, which is rotatably mounted in anti-friction bearings 116 located in the shaft mounting 117, the upper end of which is provided with a flange 118 secured, as by the cap screws 119, to the member 120, which in turn, is secured by the bolts 121 to the angle beams 58. Secured to the upper end of the shaft, as by the key 122, operating in the keyway 123, is a bevel gear 124, the key 122 being held in place by a set screw 125 (Figure 6). Meshing with the bevel gear 124 is a bevel pinion 126 mounted upon the output shaft 127 of a variable speed transmission 128. The input shaft 129 is coupled, as at 130, to the shaft 131 of an electric motor 132. As a consequence, when the electric motor 132 is operated, the bevel pinion 126 rotates the bevel gear 124, sprocket shaft 115 and sprocket 97, causing the conveyor chain 96 to pursue an orbital path around the idler sprocket 98. The shaft 46 carries a sprocket 133 with a sprocket chain 134, driven by a sprocket 135 upon the output shaft 136 of the variable speed transmission 137, driven by the electric motor 138 and adjusted for varying speeds by the hand wheel 139.

*Operation*

In the operation of the machine shown in Figures 1 to 10, inclusive, the motor 132 is energized, causing the sprocket chain 96 to travel in an orbital path around the driving sprocket 97 and idler sprocket 98. As the conveyor chain 96 moves along its guide rails 42, it moves the hangers 71 and work carrier arms 72, thereby causing the workpiece racks 78 and the workpieces 80 to be moved in a longitudinal path through the solution in the tank 10. At the same time electricity is supplied to the anode racks 27 and cathode rails 64 and 65, whereupon the brushes 83 and 84 (Figure 5) conduct the negative electricity through the cables 85 and 86 to the workpiece racks 78 and workpieces 80.

Meanwhile, the motor 138 has been started and the speed of the variable speed transmission 137 adjusted to a suitable degree by the hand wheel 139, whereupon the sprocket 135 drives the sprocket 133 and shaft 46 through the sprocket chain 134. The rotation of the shaft 46 causes a rotation of the heads 47 on its opposite ends. As the pitmans 52 are anchored on the pivot pins 54 they swing to and fro through an acute angle as the heads 47 and pins 50 are rotated, thereby oscillating the bed plates 37 and the entire superstructure secured thereto. As the bed plates 37 move to and fro transversely supported by the rollers 34 rolling in the grooved rails 33 (Figure 5), the carrier arms 72 likewise move transversely, giving a transverse oscillation to the workpieces 80 between the opposite anode racks 27.

Figure 10:
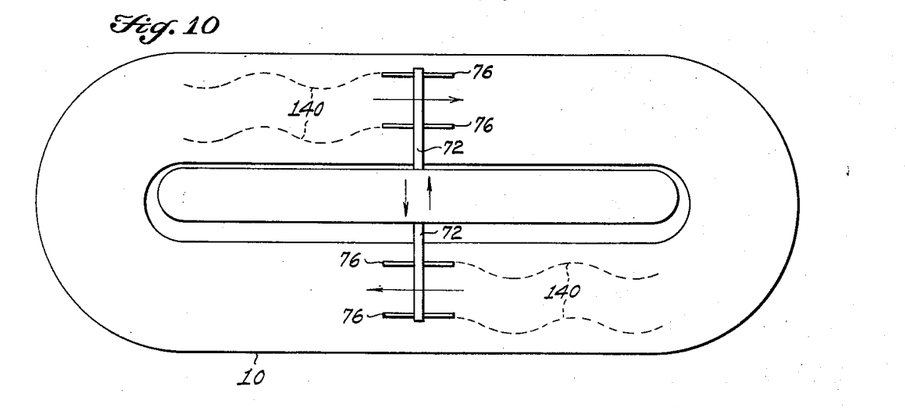
Figure 10 is a diagrammatic view showing the oscillating motion given to the workpieces and the undulating path pursued by them in traveling through the solution in the machine shown in Figures 1 to 9.

The resultant motion given to the workpieces by this arrangement is shown in Figure 10, and consists of undulating paths 140, indicated by the wavy dotted lines of Figure 10. As the workpieces 80 are thus moved in an undulating path through the solution, the solution is caused to travel between the anodes and cathodes so as to become approximately uniform in composition and at the same time the hydrogen bubbles are washed away from the surfaces of the workpieces 80. Thus, although the workpieces travel a considerable distance because of their undulating path, nevertheless the distance traveled in a straight line may be comparatively small and the time of travel correspondingly great. By this arrangement, therefore, and by thus moving the workpieces, a small tank may be given the effect of a greatly elongated tank, and uniformity of plating operation correspondingly increased.

*Modified conveyor chain driving mechanism*

Figure 11:
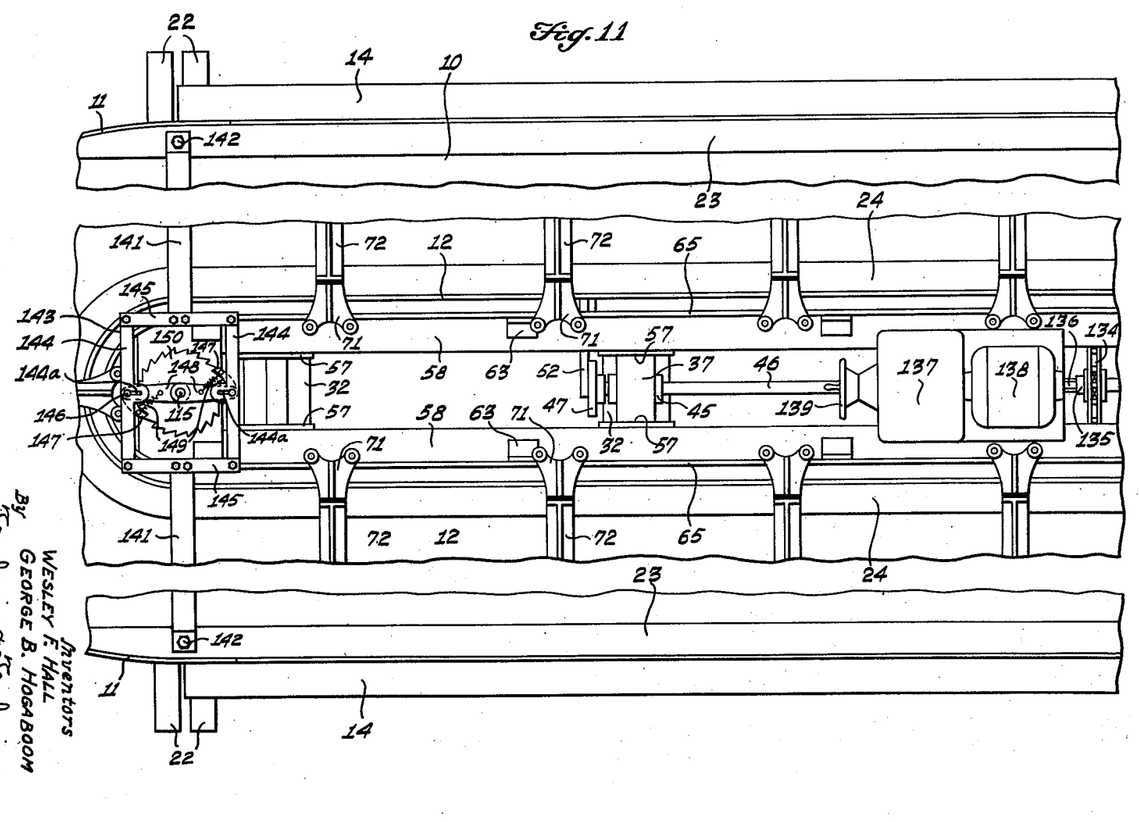
Figure 11 is a top plan view of a machine similar to Figure 1, but employing a single motor for oscillating the workpieces and having ratchet mechanism for moving the workpieces in a longitudinal or orbital path.

The machine shown in Figure 11 is substantially the same as that shown in Figures 1 to 10 except in the manner of driving the conveyor chain. In Figure 11 the chain driving motor 132, gear box 128 and other associated mechanism are omitted and replaced by a special ratchet mechanism which operates to rotate the sprocket shaft 115 in response to the transverse oscillation of the machine. To this end cross members 141 are secured by the cap screws 142 to uprights (not shown) rising from the tank edge members 23. A rectangular framework 143, consisting of side members 144, is bolted to end members 145, which in turn, are bolted to the inner ends of the cross members 141. The side members 144 are provided with slots 144ª containing pivot pins 146, carrying pawls 147 and mounted on the radius arms 148 loosely engaging the sprocket shaft 115. Springs 149 urge the pawls 147 into engagement with the teeth of a ratchet wheel 150 mounted upon and keyed to the sprocket shaft 115.

In the operation of the machine shown in Figure 11 the work carrier arms 72 and their associated superstructure are set in transverse oscillation by the rotation of the motor 138 driving the rotatable heads 47, having the pitmans 52 connected thereto and anchored at their opposite ends to the frame. The frame 143 remains in a fixed position while the ratchet wheel 150 and shaft 115 move bodily in a transverse direction. When this occurs the radius arms 148 move at angles to one another, and while one pawl 147 is pushing the tooth of the ratchet wheel 150, which it engages, the other pawl 147 is slipping over its adjacent tooth. In this manner the ratchet wheel 150 is rotated step-by-step as the machine oscillates to and fro transversely, thereby giving a step-by-step rotation to the sprocket shaft 115 and sprocket 97, causing the conveyor chain 96 to move step-by-step through an orbital path.

*Suspended link machine*

Figure 12:
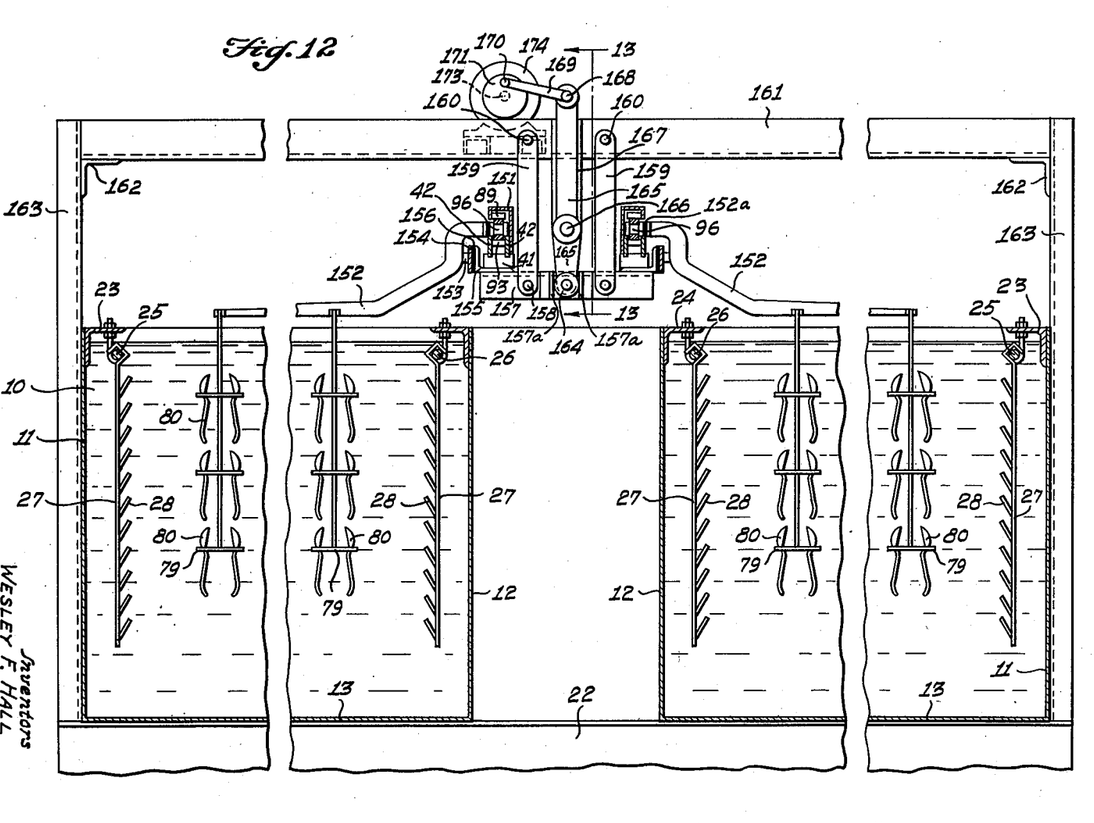
Figure 12 is a cross section similar to Figure 4, through a modified machine having a modified arrangement for supporting and oscillating the workpieces, as viewed in the direction 12—12 in Figure 13.
Figure 13:
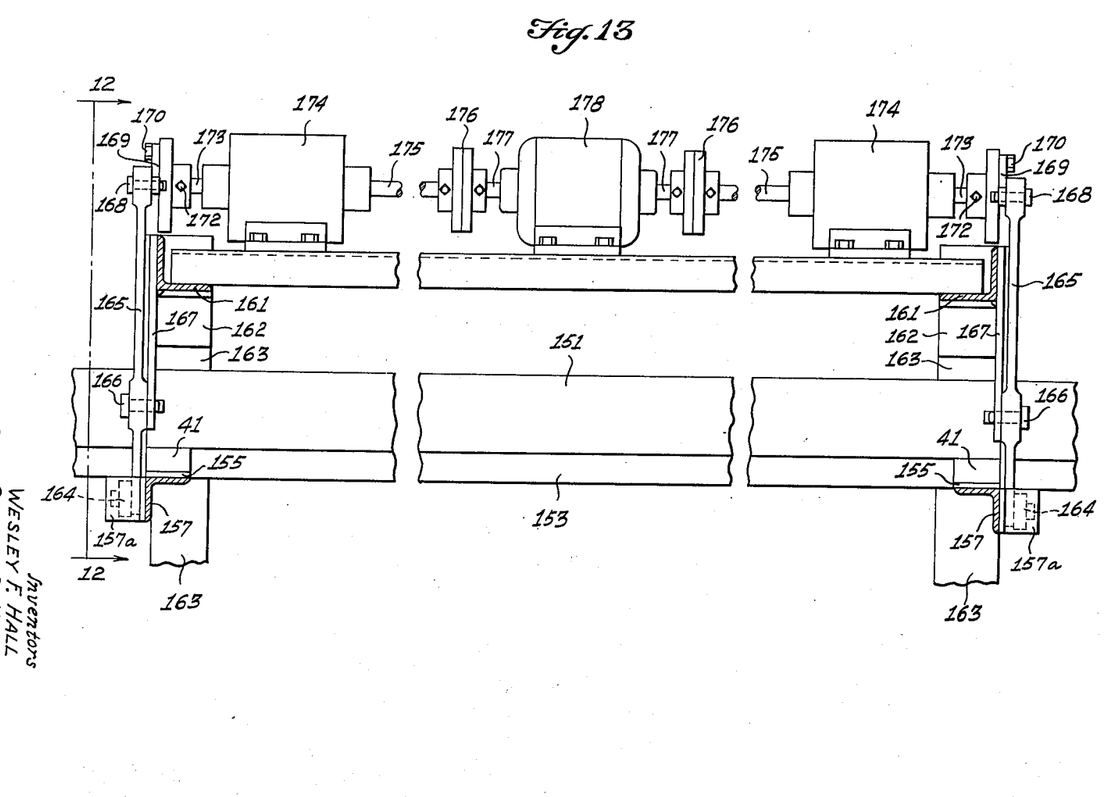
Figure 13 is a vertical section taken along the line 13—13 in Figure 12.

The modified form of machine shown in Figures 12 and 13 is in general similar to that shown in Figures 1 to 10. The conveyor chain 96 is moved in the usual way by a motor and sprockets, and pursues an orbital path with its rollers 93 engaging its guide tracks 42, and its upper rollers 89 engaging the channel guide member 15. The work carrier arm 152 is secured to but insulated at 152a from the conveyor chain 96, and carries a brush 153 engaging the cathode rail 154, mounted on the angle beam 155 and separated therefrom by the insulating layer 156. The bed member 157, upon which the blocks 41 rest, is provided with pivot pins 158 engaging links 159, the upper ends of which are pivotally mounted upon pins 160 secured to frame cross members 161, mounted upon angle brackets 162 on frame uprights 163.

The bed member 157 is provided with vertical ridges 157a, which are slidably engaged by rollers 164 rotatably mounted upon the lower ends of levers 165, which in turn, are pivoted at 166 upon brackets 167, depending from the cross members 161. The upper end of each lever 165 is provided with a pivot pin 168 engaged by a connecting rod 169, the opposite end of which engages the pivot stud 170 mounted in the rotatable head 171. The latter is secured, as by the set screw 172, to the output shaft 173 of the reduction gear box 174. Two of these gear boxes 174 and two sets of levers 165 are provided, the input shafts 175 being coupled, as at 176, to the output shaft 177 of a driving motor 178.

In the operation of the machine shown in Figures 12 and 13 the conveyor chain 96 is caused to move in an orbital path, in the manner previously described in connection with Figures 1 to 10, causing the work carrier arms 152 likewise to move in an orbital path and moving the workpieces 80 through the solution. At the same time the motor 178 rotates the heads 171, causing the levers 165 to move to and fro under the influence of the pitmans 169, thereby causing the bed member 157 to oscillate transversely as it swings from the parallel links 159. This causes the work carrier arms 152 to oscillate transversely as they move in an orbital path.

*Modified suspended link machine*

Figure 14:
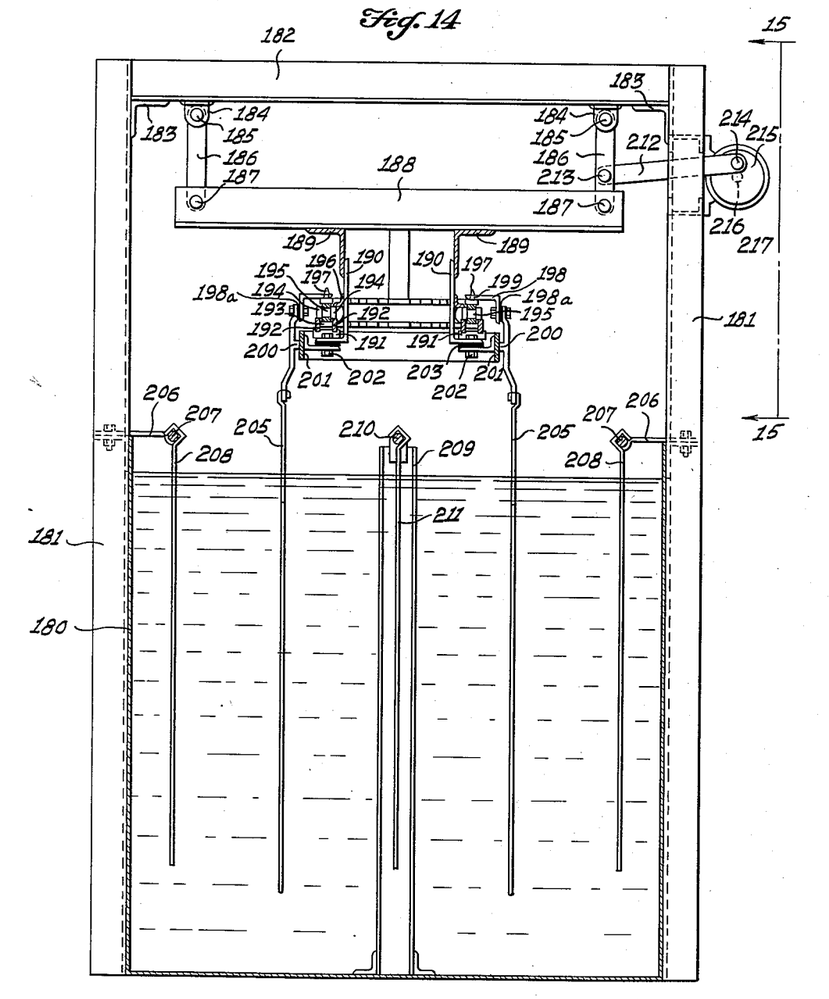
Figure 14 is a cross section of another modified machine taken in the direction of the lines 14—14 of Figure 15.
Figure 15:
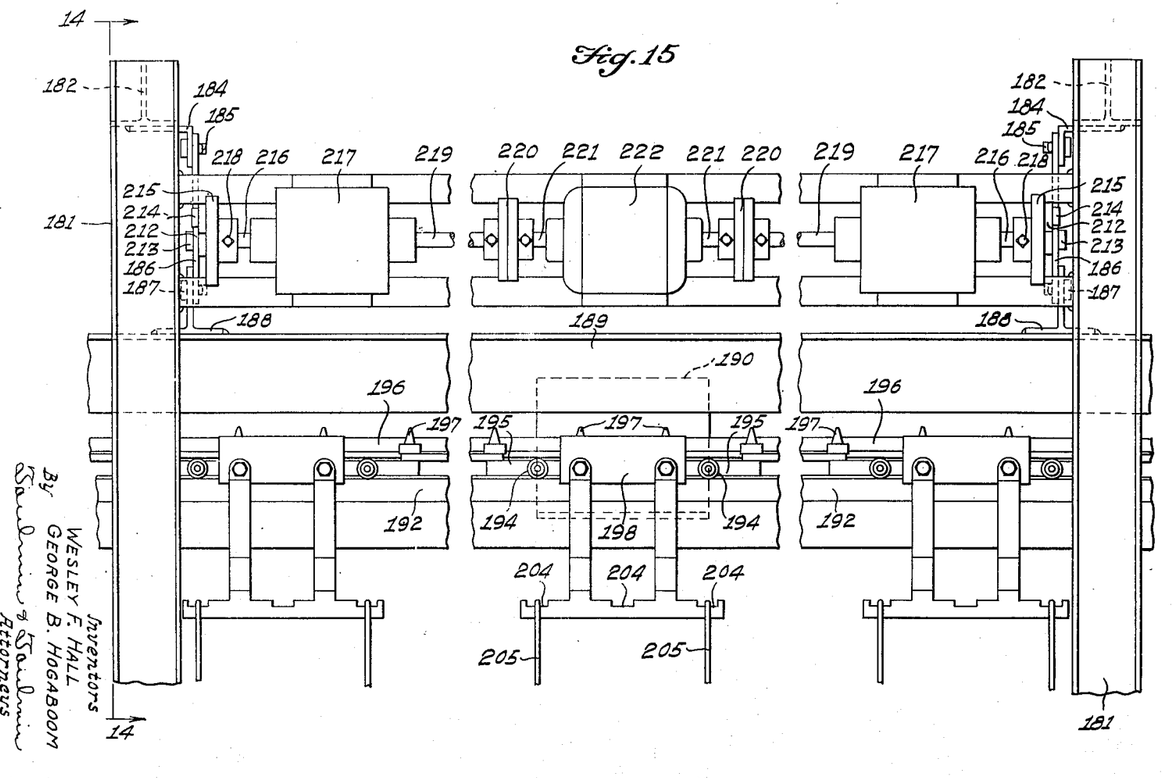
Figure 15 is a fragmentary side elevation seen in the direction of the lines 15—15 in Figure 14.

The machine shown in Figures 14 and 15 is similar in principle to the various types of machines previously described. This machine consists of a tank 180 having uprights 181, interconnected by cross members 182 resting upon angle brackets 183. The cross members 182 carry pivot supports 184 with pivot pins 185 from which depend the parallel links 186. The lower ends of the parallel links 186 are connected to pivot pins 187 mounted in the swinging cross supports 188, to which are secured the angle beams 189. Depending from the angle beams 189 are angle members 190. The angle members 190 support blocks 191, on which are mounted guide tracks 192 for the guide rollers 193 and 194 of the conveyor chain 195. The supplemental guide track 196 is secured to the angle members 190 and provides additional guidance for the rollers 194. The conveyor chain 195 carries conical pins 197 at the top thereof, these pins being arranged for the removable reception of the work carriers 198, the latter being provided with holes 199 therethrough for this purpose.

The work carriers 198 are in two pieces, bolted together and insulated at 198a from each other. The lower piece carries a brush 200 engaging the cathode rail 201, which is bolted to the angle member 190 by the bolts 202, yet insulated therefrom by the insulating members 203. The lower ends of the work carriers 198 are provided with apertures 204 for receiving the hooked ends of the work-holding racks 205. The latter extend downwardly into the solution in the tank 180, and move through the tank as the conveyor chain 195 is moved in an orbital path. The tank 180 is provided with anode rod brackets 206, carrying anode rods 207, from which are suspended the anodes 208 or anode rods on racks, depending upon which are used. The anode rods 208 may be of nickel, copper, chromium, zinc, silver, etc., depending upon the particular metal to be deposited. The anode racks, similar to the racks 27 of Figure 1, may also be employed.

Rising from the center of the bottom of the tank 180 are anode supports 209, supporting a horizontal longitudinal rod 210 from which additional anode rods or racks 211 are suspended. These are similar to the side anode rods or racks 208. The movable part of the machine suspended from the swinging cross supports 188 is oscillated to and fro by means of pitmans 212 connected at their inner ends to pivot pins 213, mounted upon certain of the parallel links 186, connected at their outer ends to pivot pins 214 mounted upon the rotatable heads 215, which in turn, are secured to the output shafts 216 of the reduction gear boxes 217 by set screws 218. The input shafts 219 of the reduction gear boxes 217 are coupled, as at 220, to the motor shaft 221 of an electric motor 222. In this connection it will be obvious that by varying the throw of the crank arm 212 (Figure 14) the extent of the transverse movement across the tank can be regulated as desired.

In the operation of the machine shown in Figures 15 and 16 the conveyor chain 195 is caused to move in an orbital path by any of the mechanisms described in connection with the previous figures. An independent motor may be used to accomplish this orbital motion, or a ratchet mechanism as described above. When the motor 222 is started the swinging cross supports 188 move to and fro transversely across the tank while the work carrying racks 205 move longitudinally in an orbital path through the tank 180. In this manner the workpieces are given an undulating travel similar to that shown by the dotted lines 140 in Figure 10.

*Modified machine employing rotatable eccentric shaft for transverse oscillation*

Figure 16:
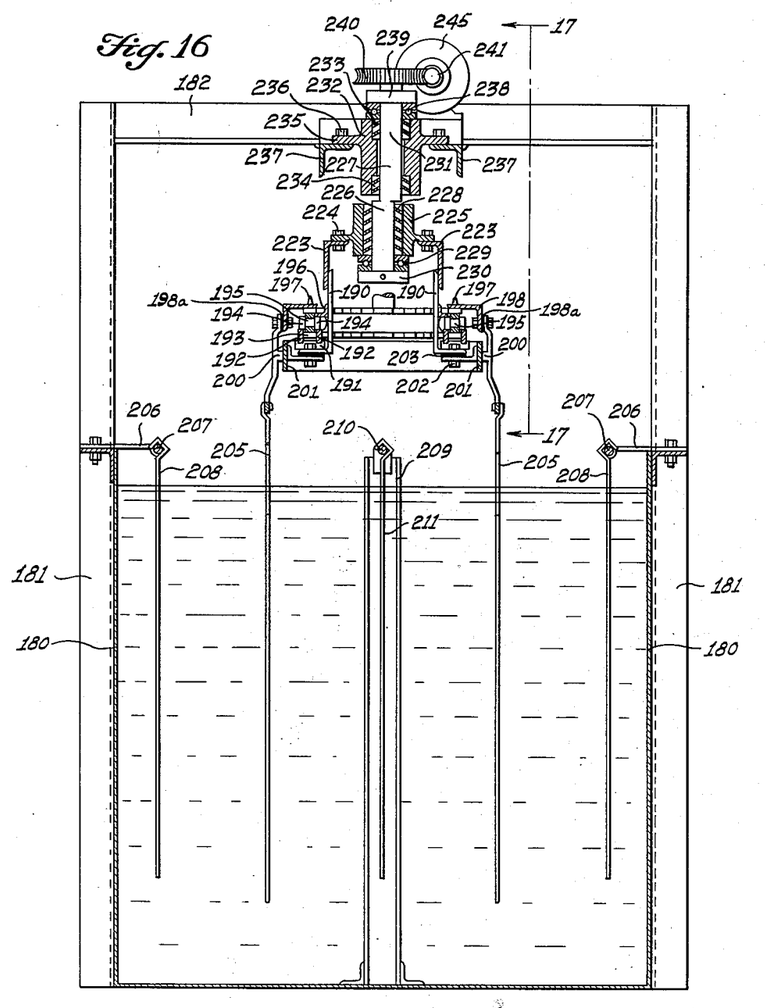
Figure 16 is a vertical cross section through still another modified machine, taken in the direction of the line 16—16 in Figure 17.
Figure 17:
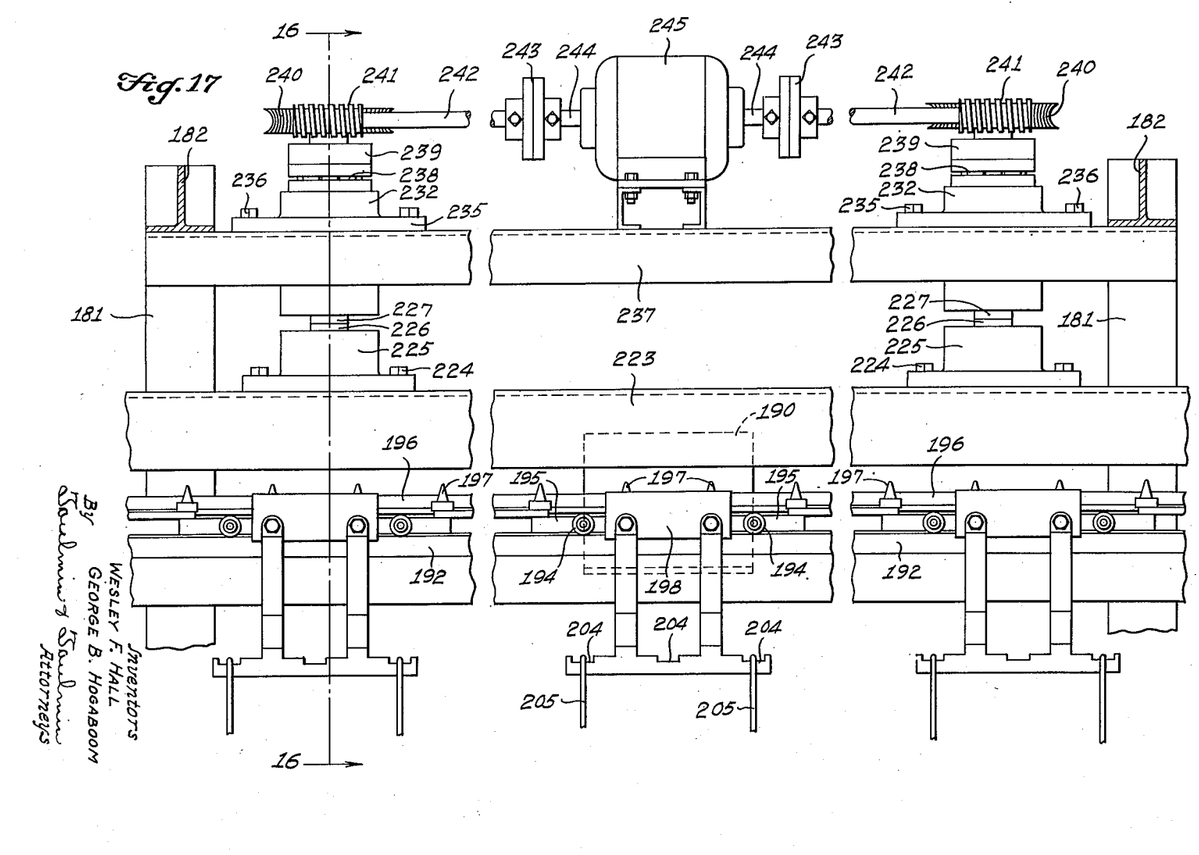
Figure 17 is a side elevation, partly in section, taken along the line 17—17 in Figure 16.

The modified machine shown in Figures 16 and 17 is similar in principle to that shown in Figures 14 and 15, and the tank, anode and conveyor chain assemblies, together with the work-holding racks, are identical. Similar numerals are therefore employed for these parts as were employed in Figures 14 and 15. The angle members 190, however, are secured at their upper ends to angle brackets 223, bolted as at 224 to hubs 225. The hubs 225 are mounted upon the eccentric portion 226 of a rotatable shaft 227, and separated therefrom by the anti-friction bearings 228. An anti-friction thrust bearing 229 and a collar 230, upon the lower end of the shaft 227, serve to retain and support the working parts. The upper end 231 of the eccentric shaft 227 is rotatably supported in a bearing mounting 232 containing anti-friction bearings 233 and 234, arranged therein.

The bearing mounting 232 is flanged, as at 235, and bolted, as at 236, to the angle members 237 secured to the lower sides of the frame cross members 182. An upper thrust bearing 238 is mounted upon the top of the bearing mounting 232 and is engaged by a collar 239 upon the upper end of the eccentric shaft 227. Above the collar 239 the shaft 227 carries a worm gear 240, which meshes with a worm 241 mounted upon a worm shaft 242. The mechanisms consisting of the eccentric shaft 227, worm gears 240 and worms 241, and worm shafts 242 are duplicated at opposite ends of the machine. The worm shafts 242 are coupled, as at 243, to the motor shaft 244 of the oscillating motor 245.

Figure 18:
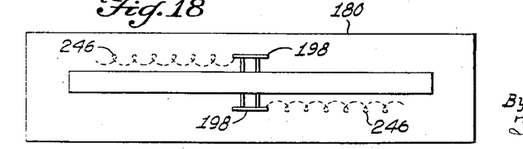
Figure 18 is a diagrammatic plan view showing the loop oscillating path pursued by a work-piece in the machine shown in Figures 16 and 17.

In the operation of the machine shown in Figures 16 and 17, the conveyor chain 195 is caused to move in an orbital path, as before, carrying with it the work carriers 198 and causing them to convey the work carrying racks 205 in an orbital path through the solution in the tank 180. The rotation of the motor 245, however, and the consequent rotation of the eccentric shaft 227, causes the hubs 225 to be given a circular oscillating motion. The combined effect of these two motions gives to the workpieces a looped undulating path of travel, shown in Figure 18 by the dotted lines 246. This combination of a transverse looped path with a longitudinal undulating path produces, as before, a mixing of the different portions of the solution and also results in washing off the hydrogen bubbles from the workpieces. With the machine and method of the present invention an evenness of plating results, in contrast with certain machines of the prior art, which move the workpiece to and fro longitudinally in the same direction that it is being conveyed. It has been found that uneven plating occurs in such machines, the forward edge of the workpiece being more heavily plated than the rearward portions thereof.

It will be understood that we desire to comprehend within our invention such modifications as come within the scope of the claims and the invention.

Having thus fully described our invention, what we claim as new and desire to secure by Letters Patent, is:

1. In an electroprocessing machine, a tank for retaining an electroprocessing solution, a long narrow frame supported above said tank, a conveyor support, a work piece conveyor chain on said conveyor support, means for moving said conveyor chain in an orbital path, parallel links for suspending said conveyor support from said frame, and means for swinging said parallel links to and fro whereby to oscillate said conveyor support and work piece conveyor chain transversely relatively to said tank.

2. In an electroprocessing machine, a tank for retaining an electroprocessing solution, a long narrow frame supported above said tank, a conveyor support, a work piece conveyor chain on said conveyor support, means for moving said conveyor chain in an orbital path, parallel links for suspending said conveyor support from said frame, and means comprising a motor-driven crank and pitman mechanism for swinging said parallel links to and fro whereby to oscillate said conveyor support and work piece conveyor chain transversely relatively to said tank.

3. In an electroprocessing machine, a tank for retaining an electroprocessing solution, a long narrow frame supported above said tank, a conveyor support, an endless conveyor on said conveyor support, means for moving said endless conveyor in an orbital path, parallel links for suspending said conveyor support from said frame, and means comprising a motor-driven crank, pitman and lever mechanism for swinging said parallel links to and fro whereby to oscillate said conveyor support transversely relatively to said tank.

4. In an electroprocessing machine, a tank for retaining an electroprocessing solution, a frame supported above said tank, a conveyor support, an endless conveyor on said conveyor support, means for moving said endless conveyor in an orbital path, means for suspending said conveyor support from said frame, and means comprising a motor driven crank, pitman and lever mechanism for swinging said suspending means to and fro whereby to oscillate said conveyor support transversely relatively to said tank.

5. In an electroprocessing machine, a tank for holding an electroprocessing solution, a frame supported above said tank, a conveyor comprising an endless member arranged to move in an orbital path over said tank, means for suspending said conveyor from said frame above said tank, and means for oscillating said conveyor suspension means while moving said endless conveyor in its orbital path.

6. In an electroprocessing machine, a tank for holding an electroprocessing solution, a frame supported above said tank, a conveyor support, means for suspending said conveyor support from said frame, means for moving said conveyor support transversely relatively to said tank, an endless conveyor chain on said conveyor support, means for moving said conveyor chain in an orbital path relatively to said tank simultaneously with said transverse movement.

7. In an electroprocessing machine, a tank for an electroprocessing solution, a frame supported above said tank, a conveyor support, means for suspending said conveyor support from said frame, a conveyor on said conveyor support, means for moving said conveyor in an orbital path, and means including a motor operating a crank and pitman for oscillating said conveyor support transversely relatively to said tank.

8. In an electroprocessing machine, a tank for an electroprocessing solution, a frame supported above said tank, a conveyor support, means for suspending said conveyor support from said frame above said tank, a conveyor on said conveyor support, means for moving said conveyor in an orbital path, and means including a motor operating a crank and pitman for oscillating said conveyor support transversely relatively to said tank, said oscillating motor being independent of said conveyor-moving means.

WESLEY F. HALL.
GEORGE B. HOGABOOM.